ELECTROSTATIC PRINTER APPARATUS

Filed June 23, 1960 4 Sheets-Sheet 1

INVENTORS
MAX PREISINGER
WALTER SCHEERER
BY John S. Gasper
ATTORNEY

ELECTROSTATIC PRINTER APPARATUS

Filed June 23, 1960

4 Sheets-Sheet 2

3,188,649

ELECTROSTATIC PRINTER APPARATUS

Max Preisinger, Fohrenbuhlstrasse 36, and Walter Scheerer, Richard-Wagner-Strasse 23, both of Sindelfingen, Baden-Wurttemberg, Germany Filed June 23, 1960, Ser. No. 38,395
4 Claims. (Cl. 346—74)

This invention relates to printing apparatus and more particularly to an electrostatic printer apparatus.

While not necessarily limited thereto, the present invention is particularly suitable for use as an output printer for recording high speed computer output data.

Various types of electrostatic printers are known in which color material from a color transport medium is transferred directly to a print medium upon the application of image producing electrostatic fields to the printing couple formed by the transport and print media. Previously known direct electrostatic printers have had field producing means which were not completely suitable for a variety of printer applications. In addition, the previous electrostatic printers had field producing means arranged in a manner so as to require considerable complexity in the circuit elements utilized for the producing of fields in the form of an image pattern corresponding with data to be recorded.

It is the general object of the present invention to provide a new and improved direct electrostatic printer.

It is a more specific object to provide an improved direct electrostatic printer which avoids the above-mentioned disadvantages.

It is also an object of the present invention to provide an improved arrangement and construction for a field producing means for direct electrostatic printing.

It is a further object of the present invention to provide an improved direct electrostatic printer operable to print simultaneously at a plurality of print positions along the print line.

In accordance with the practice of this invention, an electrostatic printer apparatus is provided having a print medium and a color transport medium movable in proximity as a printing couple past a print line. The printing couple is subjected while in motion past a print line to an electrostatic recording field rendered variable in accordance with a predetermined pattern corresponding to data to be recorded on the print medium. It is a principal feature of this invention to provide in a direct electrostatic printer a field producing means operable for producing a uniformly variable field to obtain a uniform recordable pattern on the print medium and a field control means independently operable to selectively modify the uniform recording field in accordance with the predetermined pattern to obtain a recordable data pattern on the print medium. More specifically, the present invention provides for a first electrode means for producing a uniform recording field and a second electrode means operable for selectively varying the recording field to produce the desired data pattern to be recorded.

In a preferred embodiment, the first electrode means comprises a plurality of recording electrode members arranged along a line transverse to the direction of motion of the printing couple. The control electrode means comprises one or more control electrode elements located adjacent each of the recording electrode elements. Suitable recording circuit means pulses the row of recording electrode members in succession and repetitively in timed relation with the advance of the printing couple thereby operating to produce a recordable matrix pattern. Control circuit means pulses the control electrode element in timed relation with the recording pulses and in accordance with a predetermined pulse panorama to thereby effect variations in the recordable matrix pattern to produce recorded data patterns. It is a further feature of the present invention that the recording electrode members be arranged at a plurality of printing positions along a line transverse to the direction of motion of the printing couple in that individual control electrode members be provided at each of the printing positions associated with the recording electrode members located thereat. Recording circuit means successively and repetitively pulses the recording electrode means in parallel to thereby produce parallel recordable matrix patterns. The control circuit means selectively pulses the control electrode members in a plurality of simultaneous various pulse panoramas to thereby effect a plurality of variations in the matrix patterns to record in parallel various data patterns constituting a complete line of print.

It will be readily appreciated by persons skilled in the art that the certain advantages may be realized from the subject invention which can effect simplification and economies in the design of a direct electrostatic printer apparatus. The higher potentials necessary for producing the recording fields may be confined to the recording electrode means, whereas lower potentials may be utilized in the control circuitry. In addition, by separating the recording and control functions, the means for performing the recording functions may be simplified.

The foregoing and other objects, features and advantages of the invention will be apparent from the following more particular description of preferred embodiments of the invention as illustrated in the accompanying drawings in which.

FIG. *4a* is a time-spatial development of a mosaic pattern producible in accordance with the practice of the invention.

Figure 2:
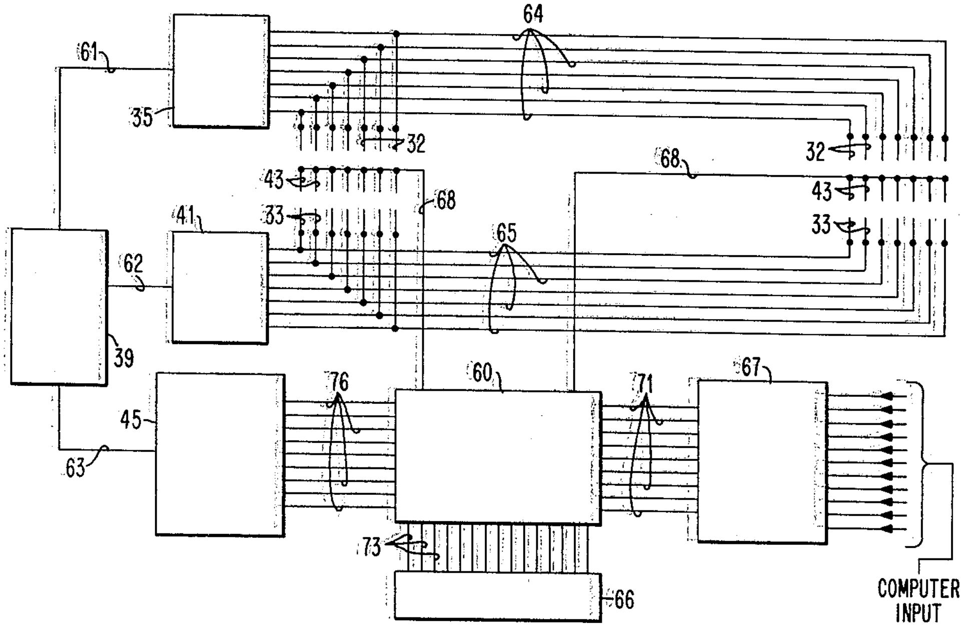
FIG. 2 is a block circuit diagram for a parallel printer embodying the principles of the subject invention.
Figure 5:
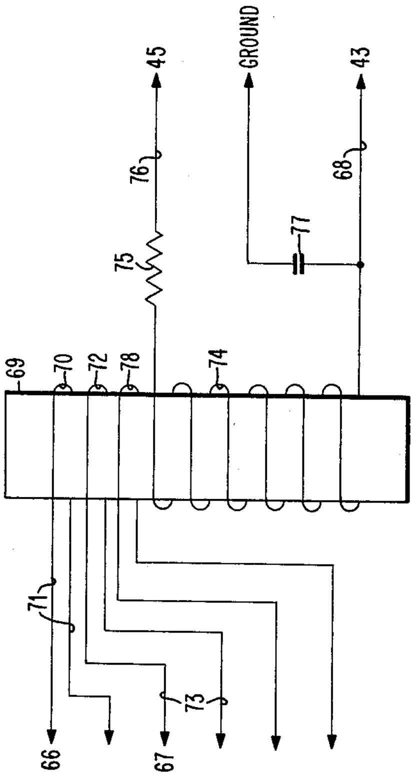

FIG. 5 is a magnetic storage element and circuit diagram of a type usable in the storage unit of FIG. 2.

Figure 6:
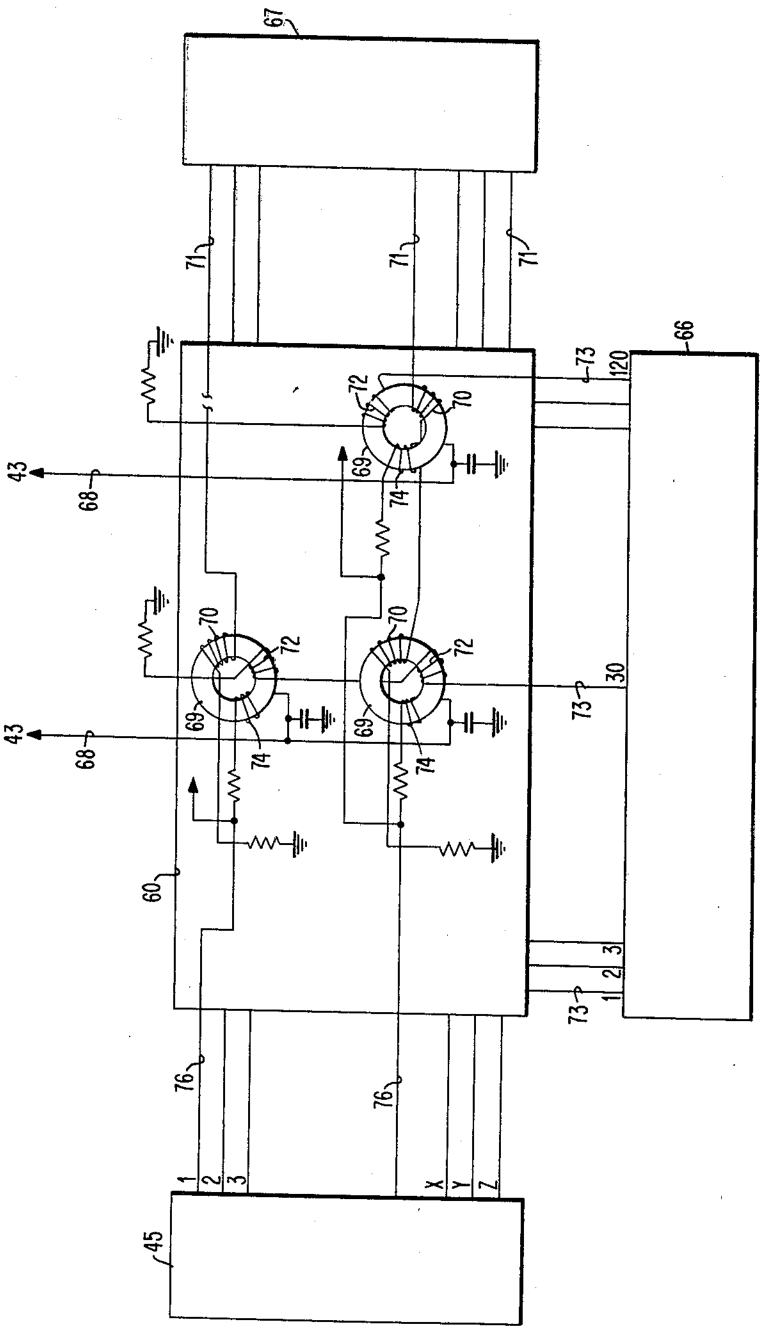

FIG. 6 is a schematic showing an arrangement of printing position amplifier for a parallel printer of FIG. 2.

Figure 1:
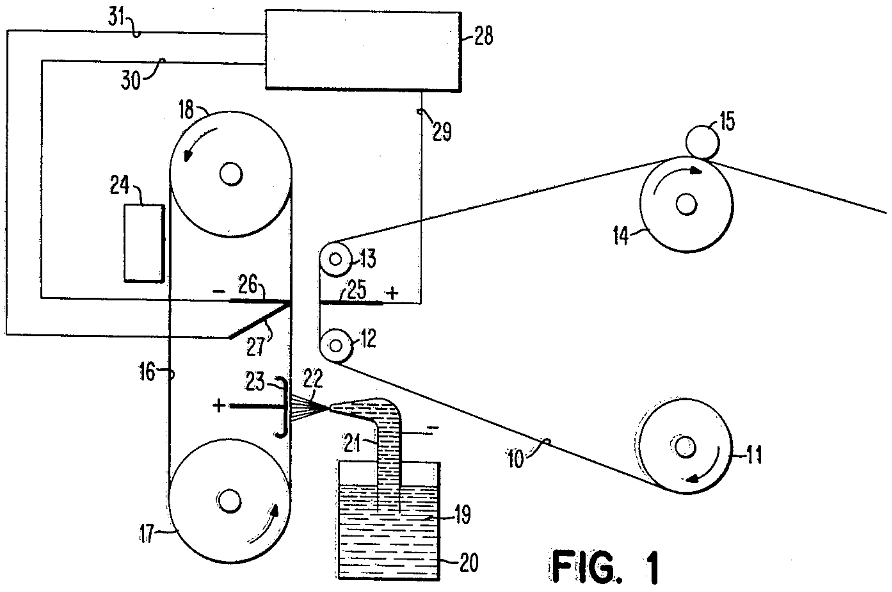
FIG. 1 is a schematic presentation of a direct electrostatic printing apparatus of the subject invention.

Referring to FIG. 1, a direct electrostatic printer operable in accordance with the present invention is shown in schematic form to facilitate description. A print medium in the form of a continuous web 10, which may be paper or the like, is fed from supply reel 11 past spaced deflection rollers 12 and 13 to a suitable receiver device such as a take-up reel not shown. Means for moving the web 10 at a continuous rate of speed are well known and may include a drive roller 14, an idler roller 15 suitably biased to press the web into frictional engagement with the surface of the drive roller 14, and motive means (not shown) connected to the drive roller 14.

Located proximate the surface of web 10 so as to form a printing couple therewith along the path of travel between the deflection rollers 12 and 13 is a continuous belt 16 of dielectric material such as plastic driven by one or both of the rollers 17 and 18. Belt 16 serves as a transport medium for color material utilized in the formation of visible recorded data on the surface of the print medium web 10. Electrostatically charged color particles are preferably applied to a surface of the belt 16 by a corona discharge spray device located at a point remote from the point where color is transferred to the web. Such devices are well known and may comprise a container 20 for a supply of liquid ink 19, and a hollow feed tube 21 leading from the ink supply 19 to a position proximate the surface of belt 16. Ink is supplied to the pointed end of tube 21 by capillary action. Potential applied to the tube 21 causes corona discharge from the end thereof thereby causing a spray 22 of charged liquid ink particles to be generated. A counter electrode 23 located beneath belt 16 has a potential applied thereto for attracting the charged spray particles causing them to be deposited on the surface of belt 16. Although various inks may be used in practicing the present invention, a preferred form of liquid ink for application in the manner described would comprise a mixture of aniline and methanol. A cleaning device 24 may be provided for removing ink not used in the recording process.

Recording electrode means 25 and 26 are located on opposite sides of a printing couple along a print line between deflection rollers 12 and 13. A control electrode 27 is located proximate the recording electrode means 26 on the under side of belt 16. A pulse generating control unit 28 shown in block form is connected by suitable leads 29 and 30 to the respective recording electrodes 25 and 26 and by lead 31 to the control electrode 27. Electrical timed pulses of a suitable polarity relative to each other and to the charge on the color material emanate from the control unit 28 to the recording electrode means 25 and 26 to effect the transfer of color material from belt surface to print medium. If the printing couple is in motion past the print line and if nothing further be done, a uniform visible pattern will be produced on the print medium corresponding to the pulses applied to the recording electrodes 25 and 26. If, however, a voltage is applied to control electrode 27, the creation of a recording electrostatic field across the electrodes 25 and 26 which transgresses the printing couple will be prevented.

While electrode means 25 and 26 may comprise single electrode members, such an arrangement would be capable of producing recorded information only in coded fashion. However, it is within the contemplation of the present invention as well to print readable mosaic patterns directly on a print medium using electrostatic fields. For that purpose, the recording electrode means 25 and 26 comprise a plurality of electrode members 32 and 33 (see FIGS. 3 and 2) arranged in parallel rows along a print line with each electrode member disposed opposite a corresponding cooperating electrode member to form a plurality of field forming recording electrodes pairs. Thus arranged a succession of pulses delivered to successive pairs of electrode members along the print line will transfer a line of dots to the print medium. With the printing couple in motion and the successive pulsing of pairs of electrodes being repeated, a plurality of rows of visible aligned dots will be formed in a matrix pattern. By selectively applying pulses to the control electrode in timed relation with the pulsing of the successive pairs of recording electrodes, it becomes possible to vary the recording field pattern to produce data patterns to be recorded in visibly readable manner.

Figure 3:
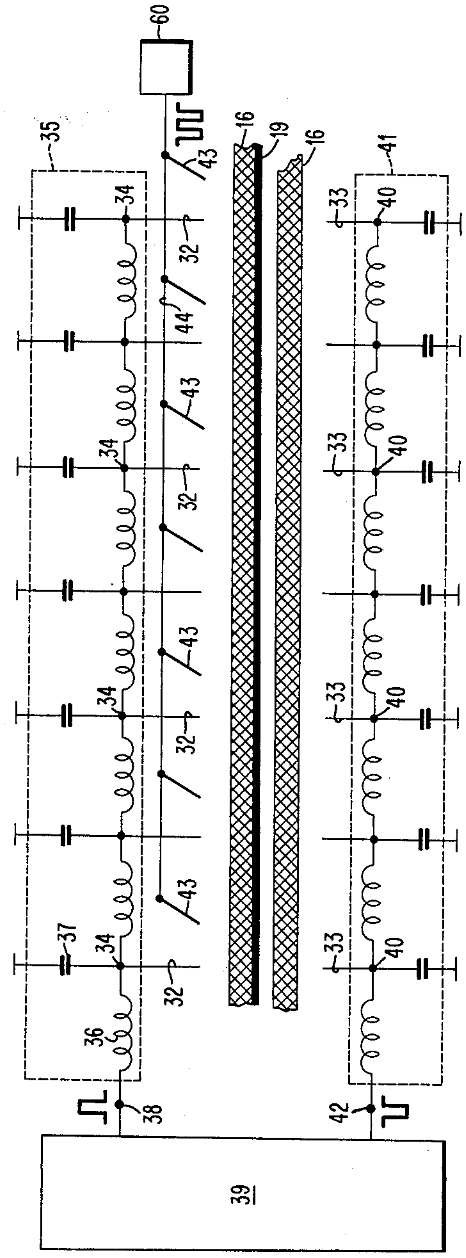
FIG. 3 is a schematic presentation and circuit diagram for one type of delay line usable in the circuit diagram of FIG. 2.

A preferred form of mechanism for producing a matrix pattern in accordnace with the above-described principle is better understood by reference to FIG. 3. As there shown, a first set of recording electrode members 32 arranged in a row and located on the under side of the belt 16 are connected to separate terminals 34 of a multistage symmetrical delay line 35, each stage of which comprises an inductance 36 and a capacitance 37. In accordance with well-known techniques, the inductance 36 and capacitance 37 of each stage are selected to provide a low-pass constant-K prototype section in which the attenuation factor over a predetermined frequency band is zero. In order to obtain uniformity in the formation of the matrix pattern, of course, the time delay of all stages must be equal so that the pulsing of the recording electrodes in succession occurs at equal intervals of time. The length of these intervals depends upon the speed with which the web 16 is to be moved past the electrodes. The input to the first stage of the delay line is connected to an output terminal 38 of a pulse generator control unit 39. Thus, for example, a positive going pulse delivered by a control unit 39 to the first stage results in a series of discrete positive going pulses of equal amplitude being delivered in sequence to the successive electrodes 32 connected to the various stages of the delay line 35.

In a similar manner, a second set of recording electrode members 33 arranged in a row aligned with the electrode members 32 and located on the upper side of web 10 is likewise connected to output terminals 40 of a second multistage delay line 41 which has characteristics identical with delay line 35. The first stage input of delay line 41 is connected to a second output terminal 42 of the pulse generator control unit 39. The application of a positive going pulse to terminal 38 is accompanied by a negative going pulse to the second terminal 42. Thus the successive pairs of electrodes are sequentially pulsed with opposite polarity to produce a uniformly variable recording electrostatic field along the print line to the extent covered by the rows of electrodes 32 and 33. Thus a linear dot pattern will be formed.

A matrix pattern may be formed on the web by repetitive pulsing of the electrode pairs in the above-described sequence in timed relation with the advance of web 10 and belt 16 transverse to the print line. For example, to form a 5 x 7 matrix pattern, each of the seven recording electrode pairs will be pulsed in sequence five times. Pulsing of the delay lines five times will, of course, be effected by the operation of a suitable pulse generator means associated with the pulse generator control unit 39.

Also shown in FIG. 3 is a control electrode which may preferably be formed of a plurality of electrode probes 43 electrically connected by a common lead 44 and located adjacent recording electrode members 32. As previously explained, the pulsing of the control electrode coincidentally with the pulsing of any of the pairs of recording electrodes operates to prevent the production of an electrostatic field by the same. Consequently, no transfer of color material can take place so that a dot pattern recordable by the predetermined uniform pulsing of the recording electrodes 32 and 33 will be varied in accordance with the pulses supplied to the control electrode 43. By placing a predetermined pulse pattern, otherwise referred to herein as an impulse panorama, on control electrode 43, the electrostatic writing field can be varied to obtain a dot pattern recordation of readable data. For this purpose, a character generator 45 is provided.

Figure 4:
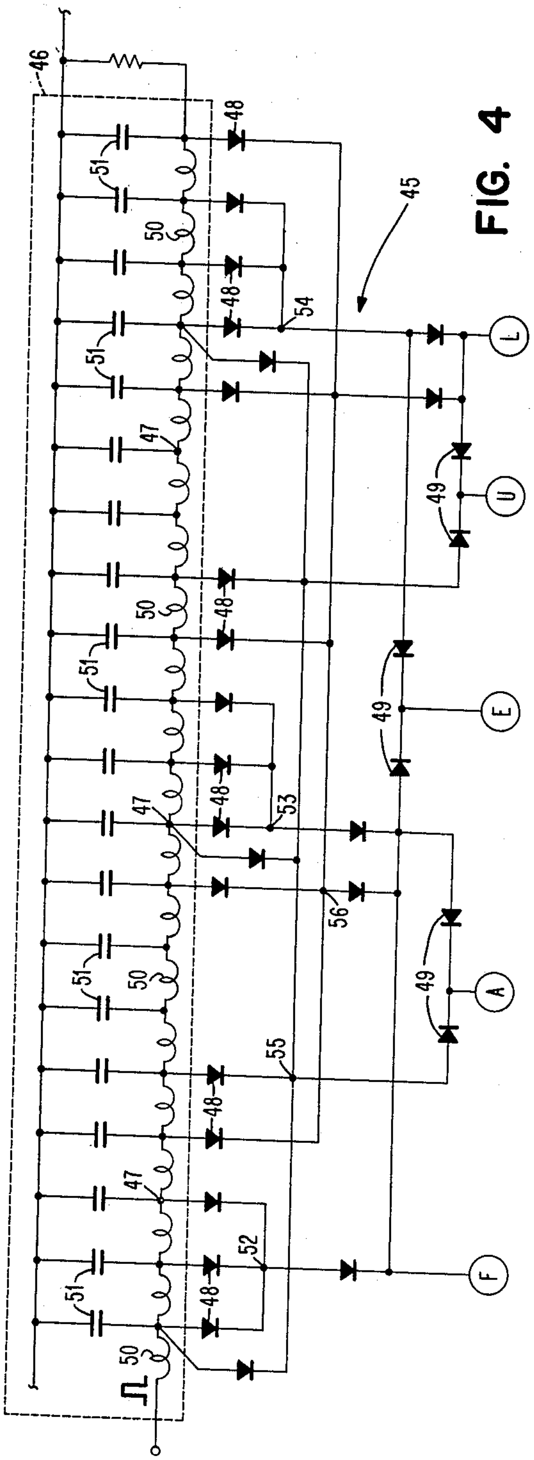
FIG. 4 is a circuit diagram of a character generator illustrating in general the principle of character generation usable in the control circuit shown in FIG. 2.

A preferred form of character generator, shown in FIG. 4, comprises a multistage delay line 46 having a plurality of output terminals 47 to which are connected coupling diodes 48 leading to AND switches 49, the outputs of which deliver the electrical image of the character to be printed. The number of stages in delay line 46, each stage of which comprises an inductance 50 and a capacitance 51, should be equal to or an even numbered multiple of the number of points in the recordable matrix pattern. The principle of the character generator is explained by means of the following simple example.

Figure 4A:
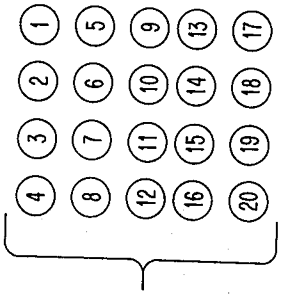

Assume for illustrative purposes that a matrix pattern to be produced by the recording electrodes is to be 4 x 5, as shown in FIG. 4*a*. Thus a delay line of at least 20 stages is required. Out of this delay line impulses may be coupled without affecting each other whereby approximately 12 coupling diodes per character would have to be utilized. By means of standardizing the characters, however, diodes may be saved. As can be seen in FIG. 4, the basic elements may be combined by connecting their outputs to common points 52, 53, 54, 55, and 56 thereby permitting production of a plurality of alphabetic characters, e.g., L, A, U, F, E. The total of diodes is thirty, that is, only six diodes per character. From this example it can be seen that the requirement of coupling diodes may be considerably reduced by means of standardization. Additional combinations for various type matrix patterns will readily occur to persons skilled in the art.

For the purpose of timing the impulses produced by the character generator 45, the input of the first phase of the delay line is connected to the control unit 39 whereby it is pulsed in synchronism with the pulsing of the delay lines 35 and 41 which drive the recording electrodes 32 and 33 and control electrode members 43. The character generator 45 emits an impulse panorama. For reasons of transmittal, the impulses from the character generator are used to modulate a frequency oscillation of approximately 2 megacycles with an appropriate stroke. This frequency modulated carrier is then transferred to a suitable amplifier means 60, the output of which is connected to a control electrode 44.

The principles of the invention are embodied in a parallel direct electrostatic printer as shown in a schematic block diagram in FIG. 2. As there shown, a pulse generator control unit 39 has outputs connected by lines 61, 62, and 63 to multistage delay lines 35 and 41 and character generator 45. Parallel connections are made by leads 64 and 65 from the outputs of each of the stages of the delay lines 35 and 41 to plural sets of recording electrode members 32 and 33 arranged at plural positions along a print line. A plurality of control electrodes 43 are positioned adjacent one side of individual sets of recording electrodes. In accordance with this embodiment, a plurality of impulse panoramas are delivered simultaneously for driving various ones of the control electrodes in parallel. The plurality of impulse panoramas are delivered through a deflection storage unit 60 under the control of a position selector 66, a translator 67 to output lines 68 connected to the various control electrodes. In the preferred embodiment, the position selector 66 which may be a ring device or the like and the translator 67 are under the control of a computer device or the like.

The deflection storage unit 60 comprises a plurality of printing position amplifiers operable under the control of the position selector 66 and translator 67. One form of printing position amplifier, as shown schematically in FIG. 5, comprises a bistable core device 69 having an energizing winding 70 connected by leads 71 to translator 66, a second energizing winding 72 connected by lead 73 to position selector 67. A signal winding 74 has one side connected through resistor 75 by lead 76 to character generator 45 and the other connected via lead 68 to a control electrode 43. A capacitor 77 coupled to lead 68 acts to place the output circuit in resonance if the core has been switched by coincident current on windings 70 and 72. A fourth winding 78 is provided as a feedback circuit for restoring the core to its original state after switching has been effected. The amplifier operates on the principle of ferroresonance; i.e., when the magnetic state of the core is switched by currents from position selector 66 and translator 67, a resonant condition is produced in the output circuit which will amplify the pulses coming from the character generator 45 to a voltage level sufficient to drive a control electrode 43 to effect suitable data recordation at the corresponding select printing position.

FIG. 6 illustrates, in brief, an arrangement for selectively pulsing a plurality of control electrodes in parallel to obtain various simultaneous data pattern recordations. A plurality of printing position amplifiers 69 are arranged in columns and rows to form a matrix pattern. The number of cores 69 required is equivalent to the product of the number of printing positions and the number of data representations desired. The inputs of each of the signal windings 74 of a row of cores 69 is connected in parallel to a lead 76 from character generator 45. Outputs from the signal windings 74 in each column, of course, are connected via lead 68 to the control electrode 43 at a corresponding printing position. The coincident current switching windings 72 in each column are connected in series with each other and by lead 73 to one position of the position selector 66. The coincident current switching windings 70 in each row cores 69 are connected in series with each other and by lead 71 to an output of the translator 67. Thus under control from a computer or the like, coincidental current from select ones of leads 71 and 73 of the translator 67 and the position selector 66, respectively, determine which of the impulse panoramas are to be gated to the various control electrodes 43. The switching of the cores 69 to provide the selective gating operations is conducted prior to the gating of the printing operation. At the end of the setup of the cores 69 in control unit 60, a print start signal may be sent to the control unit 39, see FIG. 2. Thereupon, timing pulses emanating from the control unit 39 to the delay lines 35 and 41 in the character generator 45 initiate simultaneous sequentially timed pulsing of the recording electrode members 32 and 33 at the plurality of printing positions whereby various recordable matrix patterns are produced. Coincidentally therewith, impulse panoramas emanating from the character generator 45 are gated through the preswitched cores 69 to the control electrodes 43. At the end of the printing cycle upon a suitable control signal from the computer to the control unit 39, pulsing of the delay lines and the character generator may be interrupted while the cores of the storage unit 60 are once again set up for a subsequent line of print.

Thus it will be appreciated by those skilled in the art that a new and improved direct electrostatic printing device has been provided which will permit the realization of certain economies due to simplification in electrode arrangement and circuitry for performing matrix printing operations.

While the invention has been particularly shown and described with reference to preferred embodiments thereof, it will be understood by those skilled in the art that various changes in form and details may be made without departing from the spirit and scope of the invention.

We claim:

1. In a printing apparatus, means for producing a mosaic data pattern on an electrostatically markable print medium, comprising in combination record electrode means located at a print location, (a) means for moving said print medium at a constant speed past said record electrode means and in proximity thereto, (b) means for applying a uniform sequence of mark producing record potential pulses to said record electrode means in timed relation with the advance of said print medium, (c) record suppression electrode means located proximate said record electrode means, (d) means for applying a record inhibit control potential to said suppression electrode means, (e) said control potential having a magnitude and polarity capable of inhibiting the production of a record mark on said print medium by said record electrode means when said record electrode means is energized with said mark producing pulses, (f) and means for selectively applying said control potential to said suppression electrode means in a selectively variable sequence in timed relation with the application of said uniform pattern of record pulses to said record electrode means, said control potential pattern being in accordance with a data pattern to be reproduced on said print medium.

2. In a printing apparatus, means for producing a mosaic data pattern on an electrostatically markable print medium comprising in combination, (a) record electrode means located at a print location, (b) means for moving said print medium at a constant speed past said record electrode means and in proximity thereto, (c) means for applying a uniform sequence of mark producing record pulses to said record electrode means, (d) record suppression electrode means located proximate said record electrode means, (e) means for applying a record inhibit control potential to said suppression electrode means, (f) said control potential having a magnitude and polarity capable of inhibiting the production of a record mark on said print medium by said record electrode means when energized with said mark producing pulses, (g) means for selectively applying said control potential to said suppression electrode means in a selectively variable sequence in accordance with data to be recorded, (h) and means for co-ordinating the application of said uniform sequence of record pulses and said selectively variable sequence of control pulses in timed relation with the advance of said print medium.

3. In a printer operable for producing data patterns from a matrix of discrete marks such as dots or the like, means for variably selectively producing said data patterns on an electrostatically markable print medium, comprising in combination, (a) record electrode means for producing electrostatically induced marks on said print medium comprising a plurality of record electrode members arranged in a row proximate said print medium and in an array transverse to the direction of travel of said print medium, (b) means for moving said print medium at a constant speed past said array of record electrode members, (c) means for applying a mark producing voltage to said record electrode members in a repetitive uniform sequence in timed relation with the advance of said print medium, (d) record suppression electrode means located proximate said record electrode members, (e) means for applying a record inhibit control potential to said suppression electrode means whereby said electrode members of said record electrode means may each be prevented from producing a pattern mark when energized on said print medium, (f) and means for controlling the application of said record inhibit control potential in a selectively variable sequence in timed relation with the application of said record potential in said uniform sequence, said application of said control potential occurring in accordance with a data pattern to be reproduced.

4. In a printing apparatus, means for producing one or more mosaic data patterns simultaneously at plural uniformly spaced print line positions on an electrostatically markable print medium comprising in combination, (a) means for moving said print medium at a uniform speed transversely to said print line, (b) data pattern print means located at each of said print positions along said print line proximate the line of travel of said print medium, (c) each of said data pattern print means having plural mark producing record electrode members arranged in a row along said print line, (d) means for applying record potential pulses simultaneously to said mark producing record electrode members of said print means in a uniform repetitive sequence, (e) plural record suppression control electrode means located along said print line, a record suppression control electrode means being located adjacent an individual print means proximate all of the record electrode members thereof, (f) means for applying a record inhibit potential to each of said suppression control electrode means of a polarity and magnitude capable of preventing the recording of a mark by said record electrode members of said print means, (g) means for selectively applying said record inhibit control voltage potential simultaneously to said plural suppression control electrode means in a plurality of selectively variable pulse sequences in accordance with data patterns to be produced at said print positions, (h) and means for co-ordinating the application of said uniform sequence of record voltage pulses to said record electrode members and the application of said selectively variable control voltage pulse sequences in timed relation with the advance of said print medium past said print line.

References Cited by the Examiner

UNITED STATES PATENTS

| | | | |
|---|---|---|---|
| 2,901,374 | 8/59 | Gundlach | 117—17.5 |
| 2,918,580 | 12/59 | Howell | 346—74 XR |
| 2,919,171 | 12/59 | Epstein et al. | 346—74 |
| 2,930,847 | 3/60 | Metzger | 178—23 |
| 3,012,839 | 12/61 | Epstein et al. | 346—74 |
| 3,068,479 | 12/62 | Benn et al. | 346—74 |

FOREIGN PATENTS

| | | | |
|---|---|---|---|
| 734,909 | 8/55 | Great Britain. | |

IRVING L. SRAGOW, *Primary Examiner.*

ROBERT A. LEIGHEY, *Examiner.*

UNITED STATES PATENT OFFICE
CERTIFICATE OF CORRECTION

Patent No. 3,188,649 June 8, 1965

Max Preisinger et al.

It is hereby certified that error appears in the above numbered patent requiring correction and that the said Letters Patent should read as corrected below.

In the grant, lines 1 to 3, for "Max Preisinger and Walter Scheerer, both of Sindelfingen, Baden-Wurttemberg, Germany," read -- Max Preisinger and Walter Scheerer, both of Sindelfingen, Baden-Wurttemberg, Germany, assignors to International Business Machines Corporation, of New York, N. Y., a corporation of New York, --; line 12, for "Max Preisinger and Walter Scheerer, their heirs" read -- International Business Machines Corporation, its successors --; in the heading to the printed specification, lines 3 to 5 for "Max Preisinger, Fohrenbuhlstrasse 36, and Walter Scheerer, Richard-Wagner-Strasse 23, both of Sindelfingen, Baden-Wurttemberg, Germany" read -- Max Preisinger and Walter Scheerer, both of Sindelfingen, Baden-Wurttemberg, Germany, assignors to International Business Machines Corporation, New York, N. Y., a corporation of New York --.

Signed and sealed this 7th day of December 1965.

(SEAL)
Attest:

ERNEST W. SWIDER
Attesting Officer

EDWARD J. BRENNER
Commissioner of Patents